Oct. 22, 1935. D. C. SCOTT 2,018,385
TENSILE STRENGTH TESTING MACHINE
Filed Sept. 20, 1928 2 Sheets-Sheet 1
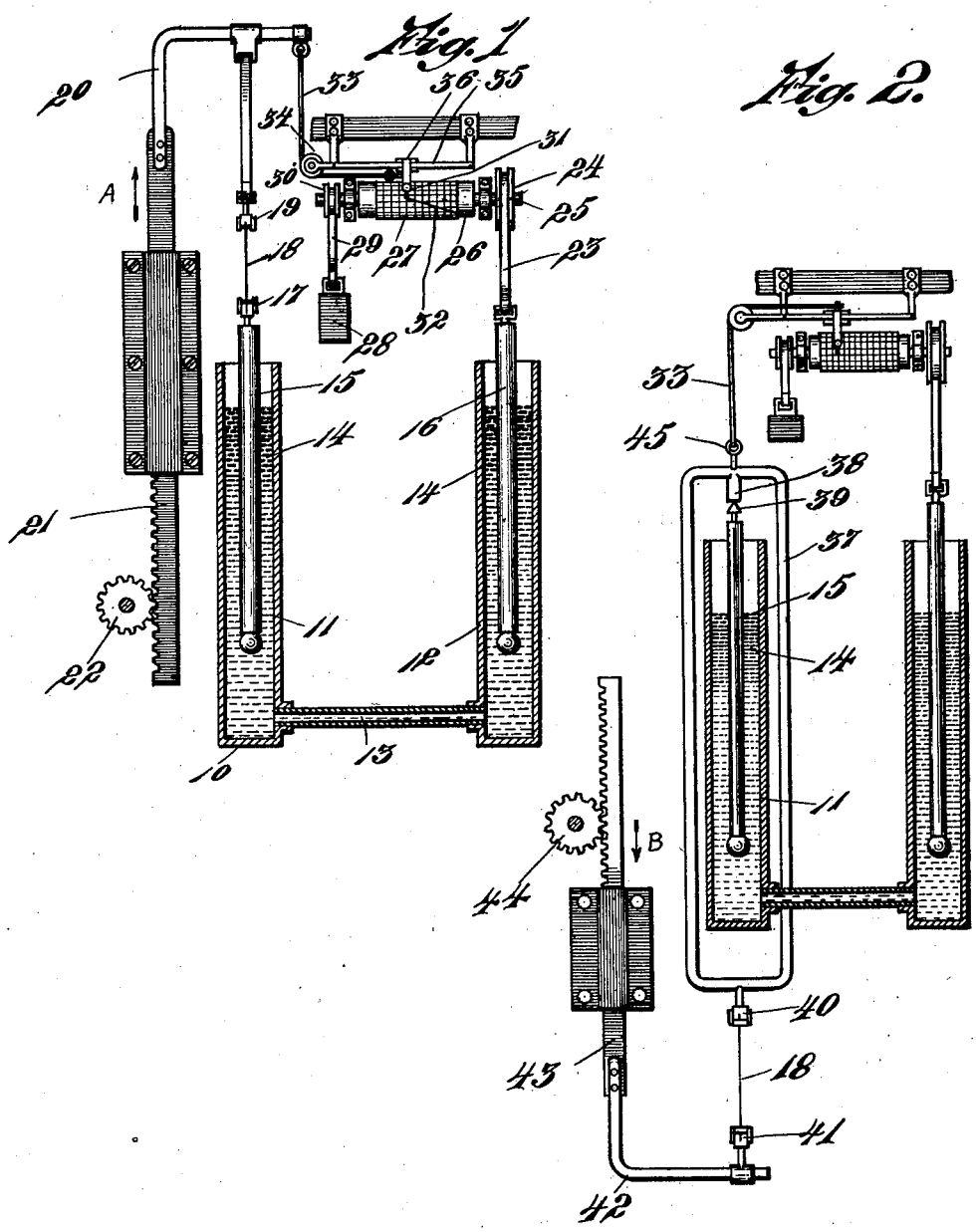
INVENTOR.
David C. Scott.
BY Barlow & Barlow
ATTORNEYS.

Oct. 22, 1935.  D. C. SCOTT  2,018,385
TENSILE STRENGTH TESTING MACHINE
Filed Sept. 20, 1928  2 Sheets-Sheet 2
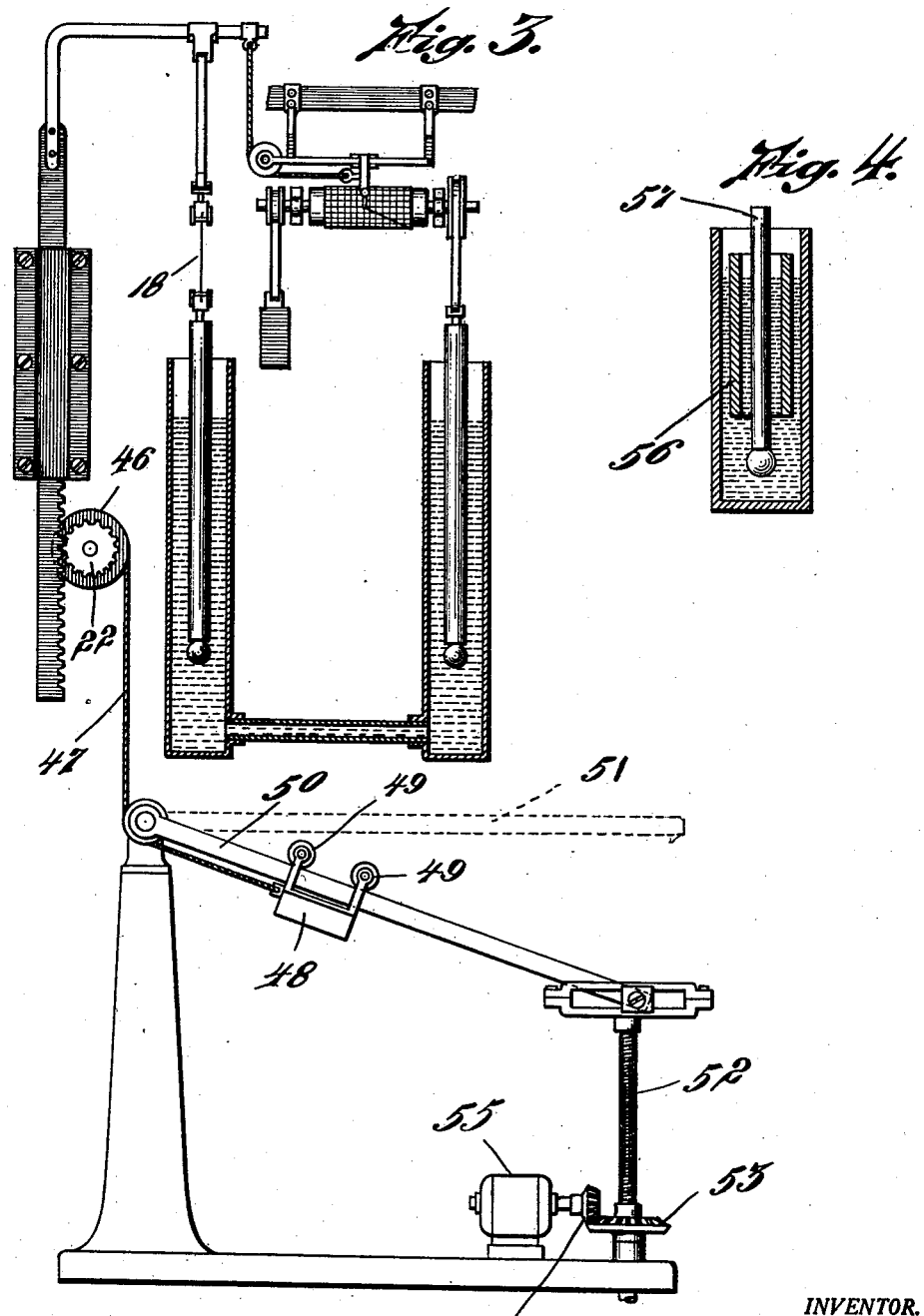
INVENTOR.
David C. Scott.
BY Barlow & Barlow
ATTORNEYS.

Patented Oct. 22, 1935

2,018,385

UNITED STATES PATENT OFFICE 2,018,385

TENSILE STRENGTH TESTING MACHINE

David C. Scott, Providence, R. I., assignor to Henry L. Scott Company, Providence, R. I., a corporation of Rhode Island Application September 20, 1928, Serial No. 307,158

4 Claims. (Cl. 265—2)

This invention relates to an improved apparatus for testing the strength or stretch of materials; and has for its object to provide a simple and efficient type of testing machine in which the recording mechanism is moved automatically to record the test results.

A further object of the invention is the provision of a construction by which very delicate fibers may be tested with fluid actuated means for recording the test.

A still further object of the invention is the provision of a liquid with one end of the specimen to be tested connected to a float therein, which float will move into or out of the liquid as the load on the specimen is applied to consequently vary the level of the liquid in its container and vertically move an independent float in the liquid to operate a recording mechanism.

This invention further consists in the provision of a construction for applying a uniformly increasing pull upon the specimen and at the same time automatically compensate for any stretch of the specimen so that the time element will be constant in which a given load is applied to the specimen.

With these and other objects in view, the invention consists of certain novel features of construction, as will be more fully described, and particularly pointed out in the appended claims.

In the accompanying drawings:

Figure 1 is a side view partially in section illustrating more or less diagrammatically the arrangement of mechanism for using my improved test.

Figure 2 is a view similar to Figure 1, showing a modified construction for applying the test in which the weight float instead of being lifted from the liquid is immersed in the liquid to change its level.

Figure 3 is a view similar to Figure 1 with additional means of providing a uniformly increasing load irrespective of the stretch or extendibility of the specimen.

Figure 4 is a view of modified construction of tank and floats showing one of the floats as annular, with the other floats supported within the same.

In accordance with the invention a testing machine construction is provided wherein the movable weight which is attached to one end of the specimen is floated in a liquid so that as the weight is lifted from the liquid or moved therein by reason of a pull on the specimen being tested the level of the liquid will be changed and by reason of a second independent float a vertical movement of this change of level will cause a corresponding vertical movement of the second float which movement is utilized to actuate the recording mechanism and record the test results; and the following is a detailed description of the present embodiment of this invention showing in a diagrammatic way the preferred means by which these advantageous results may be accomplished:

With reference to the drawings 10 designates a container which may be in general U-shape, as illustrated in Figures 1 and 2 having elongated parts 11 and 12 connected at 13 so that the liquid 14 may freely flow from one part to the other.

In this container a weight float 15 is positioned in the part 11 of the container and a record actuating float 16 is positioned in the part 12 of the container, it being apparent that as the float 15 is moved into or out of the liquid 14 the level of the liquid will be changed in the container and a corresponding movement of the float 16 will be effected. This weight float 15 has attached thereto, a suitable work-engaging element or clamp 17 to which one end of the specimen 18 to be tested may be secured. The other end of the specimen 18 is attached to a work-engaging element or clamp 19 which is moved by means of the L-shaped arm 20, rack 21 and pinion 22 and a power device such as a motor (not shown), upwardly, as illustrated by the arrow a, to exert tension on the specimen 18 to lift the weight float 15 out of the liquid 14 until the specimen 18 breaks by reason of the force applied thereto. As the weight 15 is moved out of the liquid 14 its level will be lowered both in the parts 11 and 12 of the container and as the level of the liquid 14 is lowered in the part 12 of the container the record actuating float 16 will also drop vertically to pull a suitable strap 23 connected to the float 16 to rotate a pulley 24 mounted on the shaft 25 which shaft also carries a drum 26 and recording chart 27, a counterweight 28 being mounted by strap 29 about the pulley 30 to cause movement of the drum 26 in the opposite direction as the float 16 is vertically moved upwardly. A suitable pencil 31 is provided to draw a curve on the part 27 and is moved axially of the drum 26 by means of a cord 33 attached to the arm 20 and moving over pulley 34. The pencil is suitably guided by means of a track 35 and carriage 36. In this way it will be apparent that the stretch of the material as well as the load exerted thereupon will be recorded on the chart.

In some cases, it is found desirable to apply tension to the specimen 18 in such a way that the weight float 15 will be moved into the liquid 14 against its buoyant effect rather than lifted therefrom, as illustrated in Figure 1, in which case I provide a yoke 37 positioned about part 11 of the container with a finger 38 engaging a pin 39 carried by the float 15 and position a clamp 40 at the lower end of this yoke with the work-engaging element or clamp 41 attached to the L-shaped arm 42 which is in turn carried by the rack 43 and moved by a pinion 44 downwardly, as illustrated by the arrow b by some power means (not shown), the load in this case being applied in a direction opposite to that described in Figure 1. In this case the recording mechanism is the same as illustrated in Figure 1 with the cord 33 attached to the yoke at 45, which is a more convenient place for attachment to obtain the required movement of the pencil in this modification of the invention.

The liquid which will be employed, for example mercury, will be such that it will not cling and cause appreciable friction on the floats moving in and out of the liquid and it is preferred that such a liquid be one that the floats when lifted therefrom will emerge from the liquid dry with none of the liquid adhering thereto.

It will also be understood that the relative size of the container for the liquid and the floats may be varied to obtain the desired movement but I have found it preferable to use a vertically elongated container with a small amount of fluid so that a large change of level of the fluid will be obtained by movement of the float into or out of the same, and in order to construct the floats so compactly house in a small amount of liquid I may make one annular as illustrated at 56 in Figure 4 to encircle the other float. This form of container and floats, for example, may be attached to the recording mechanism shown in Figs. 1 and 3, by securing the strap 23 and its connection to the outer edge of the float 56 and the clamp 17 to the float 57. It will be necessary to extend the right angularly disposed portion of the arm 20 and to this extension secure at right angles thereto the upper connection to the support for the clamp 19, so that the support and clamps 19 will be in line with the clamp 17.

In the embodiment illustrated in Figure 3, I have shown a means for applying a uniformly increasing pull or load to the specimen irrespective of the stretch of the specimen as the construction is such that the stretch is automatically compensated for. This result is accomplished by attaching to the pinion 22 a drum 46 about which a cord 47 is wound. This cord is attached to a weight 48 which is supported by means of rollers or wheels 49 on the inclinable supporting plane 50 which plane when in horizontal position as illustrated in dotted lines 51, exerts no pull upon the cord 47 and consequently no pull upon the specimen 18 to be tested.

This supporting plane is adjusted by means of screw 52 actuated through worm gear 53, worm 54 and motor or other source of power 55 and as this supporting plane is lowered at one end the weight 48 tends to move along the incline of this plane to exert pull upon the specimen and it is immaterial the extent the specimen stretches as this stretch is taken up by movement of the weight along the incline of the plane. In this way by a constant rate of operation of the screw 52 the effectiveness of the weight 48 constantly increases to apply a constantly increasing load on the specimen during any increment of time irrespective of the stretch of the material. In other words, the load applied to specimens being tested would be at the same rate whether the specimen be glass with no elastic extendibility or rubber with a great extendibility or elasticity.

This time element is exceedingly important in the testing of such delicate fibers as silk and rayon.

It will, of course, be understood in this invention that the float will be of such material as not to absorb any of the liquid.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:—

1. In a testing machine, a recording mechanism, a container, a liquid therein, a float in said liquid, means by which one end of a specimen to be tested may be attached to said float, means adapted to be attached to the other end of the specimen for exerting a tension thereon and moving a portion of said recording mechanism, thereby producing a movement of the float through the specimen, means responsive to the movement of the liquid as produced by the movement of said float for moving another portion of said recording mechanism.

2. In a testing machine, a recording mechanism, a container, a liquid therein, a float in said liquid, means by which one end of a specimen to be tested may be attached to said float, means adapted to be attached to the other end of the specimen for exerting a tension thereon and for moving a portion of said recording mechanism, and to produce a movement of the float in the liquid, whereby the level of said float is effected, a second float in said liquid operatively connected to another portion of the recording mechanism to operate the same in conjunction with the tensioning means upon the change of level of the float in said container.

3. In a testing machine, a container, liquid therein, a float in said liquid, means for attaching one end of the specimen to be tested to said float, means for imparting to the other end of the specimen a uniformly increasing load with relation to a time increment irrespectively of the stretch or extendibility of the specimen tested, whereby a corresponding change in immersion of the float in the liquid and a corresponding change in liquid level is obtained, a recording mechanism, and means responsive to the change of level of the liquid in the container and to the loading means for operating said recording mechanism.

4. In a testing machine, a container, a liquid therein, a float in said liquid, means by which one end of the specimen to be tested may be attached to said float, an inclinable support, a weight movably mounted thereon, means by which said weight is attached to the other end of the specimen, means for inclining said support whereby the weight exerts a pull on the specimen and thus produces a movement of said float, a recording mechanism, and means responsive to the effective changes of said liquid as effected by said float, and to the movement of said weight to operate said recording mechanism.

DAVID C. SCOTT.